US008289857B2

(12) United States Patent
Siemens et al.

(10) Patent No.: US 8,289,857 B2
(45) Date of Patent: Oct. 16, 2012

(54) METHOD FOR DETERMINING A DATA TRANSPORT UNIT PARAMETER FOR THE COMMUNICATION BETWEEN TWO STATIONS IN A NETWORK OF STATIONS, NETWORK DEVICE ADAPTED TO ACT AS A SENDING STATION AND NETWORK DEVICE ADAPTED TO ACT AS A RECEIVING STATION IN THE METHOD

(75) Inventors: Eduard Siemens, Sehnde (DE); Daniel Eggert, Hannover (DE)

(73) Assignee: TIXEL GmbH, Hannover (DE)

( * ) Notice: Subject to any disclaimer, the term of this patent is extended or adjusted under 35 U.S.C. 154(b) by 401 days.

(21) Appl. No.: 12/584,301

(22) Filed: Sep. 3, 2009

(65) Prior Publication Data

US 2010/0067397 A1   Mar. 18, 2010

(30) Foreign Application Priority Data

Sep. 15, 2008 (EP) .................................. 08305551
Jul. 4, 2009 (EP) .................................. 09008792

(51) Int. Cl.
*H04J 1/16* (2006.01)
(52) U.S. Cl. ........................................ 370/248; 370/252
(58) Field of Classification Search .................. 370/252, 370/253, 248, 216, 236.1, 236.2, 238, 235, 370/229, 241.1
See application file for complete search history.

(56) References Cited

U.S. PATENT DOCUMENTS

| | | | | |
|---|---|---|---|---|
| 6,208,653 B1 * | 3/2001 | Ogawa et al. | ............ | 370/395.52 |
| 2003/0188015 A1 | 10/2003 | Lee et al. | | |
| 2005/0081116 A1 * | 4/2005 | Bejerano et al. | ................ | 714/47 |
| 2007/0124412 A1 * | 5/2007 | Narayanaswami et al. | ... | 709/217 |
| 2007/0214379 A1 * | 9/2007 | Abraham et al. | ................. | 714/4 |
| 2009/0262657 A1 * | 10/2009 | Ekelin et al. | ................... | 370/252 |

OTHER PUBLICATIONS

J. Mogul, "Path MTU Discovery Specification", RFC 1191, IETF, Nov. 1990.
Mathis et al., "Packetization Layer Path MTU Discovery Specification". RFC 4821, IETF, Mar. 2007.
European Search Report dated Jul. 4, 2009 for related EP application EP09008792.

* cited by examiner

*Primary Examiner* — Brenda H Pham
(74) *Attorney, Agent, or Firm* — Howard IP Law Group, P.C.

(57) ABSTRACT

The invention concerns the technical field of a so-called Path MTU (Maximum Transmission Unit) Discovery process between two computing nodes over packet switched networks. On the path between two hosts (H1, H2, H3) in the network may exist various hops, e.g. routers (R1, R2), a packet needs to pass. Each link between two hops has its own MTU which may differ on each link. Some path MTU discovery algorithms are based on sending probe packets with the DF (don't fragment) bit set in the IP header. However, security devices, e.g. firewalls, often block ICMP messages, including the ICMP error messages that are needed for these path MTU discovery algorithms to work.

In order to deal with connections, on which ICMP messages are blocked within the network nodes, the invention relies on acknowledgements of probe packets with MTU sizes of common network technology based MTU values sent back by the destination host. In addition, these common values increased by one byte are sent as well, to identify that the effective path MTU is a common MTU or in between of two common MTUs.

18 Claims, 4 Drawing Sheets

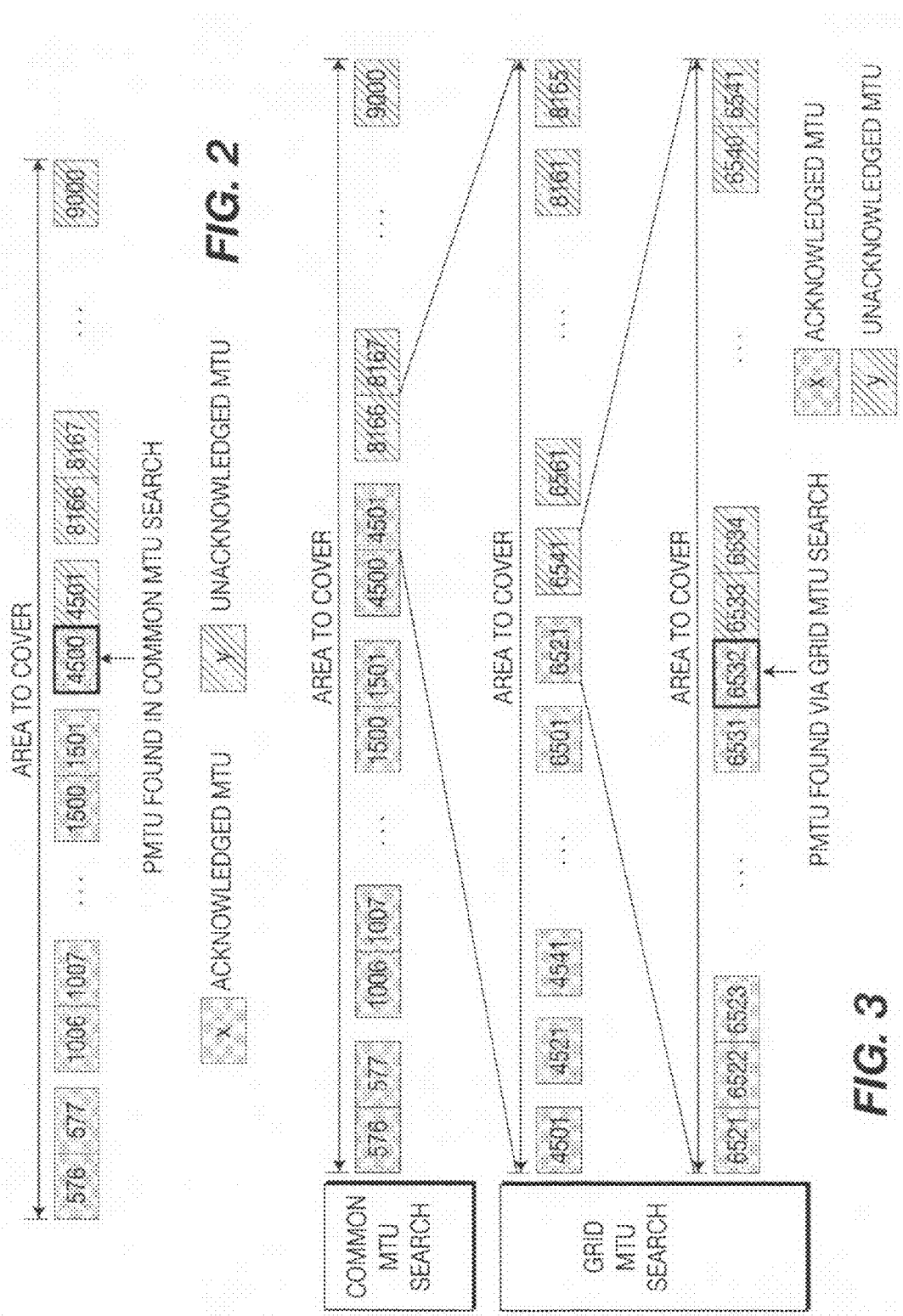

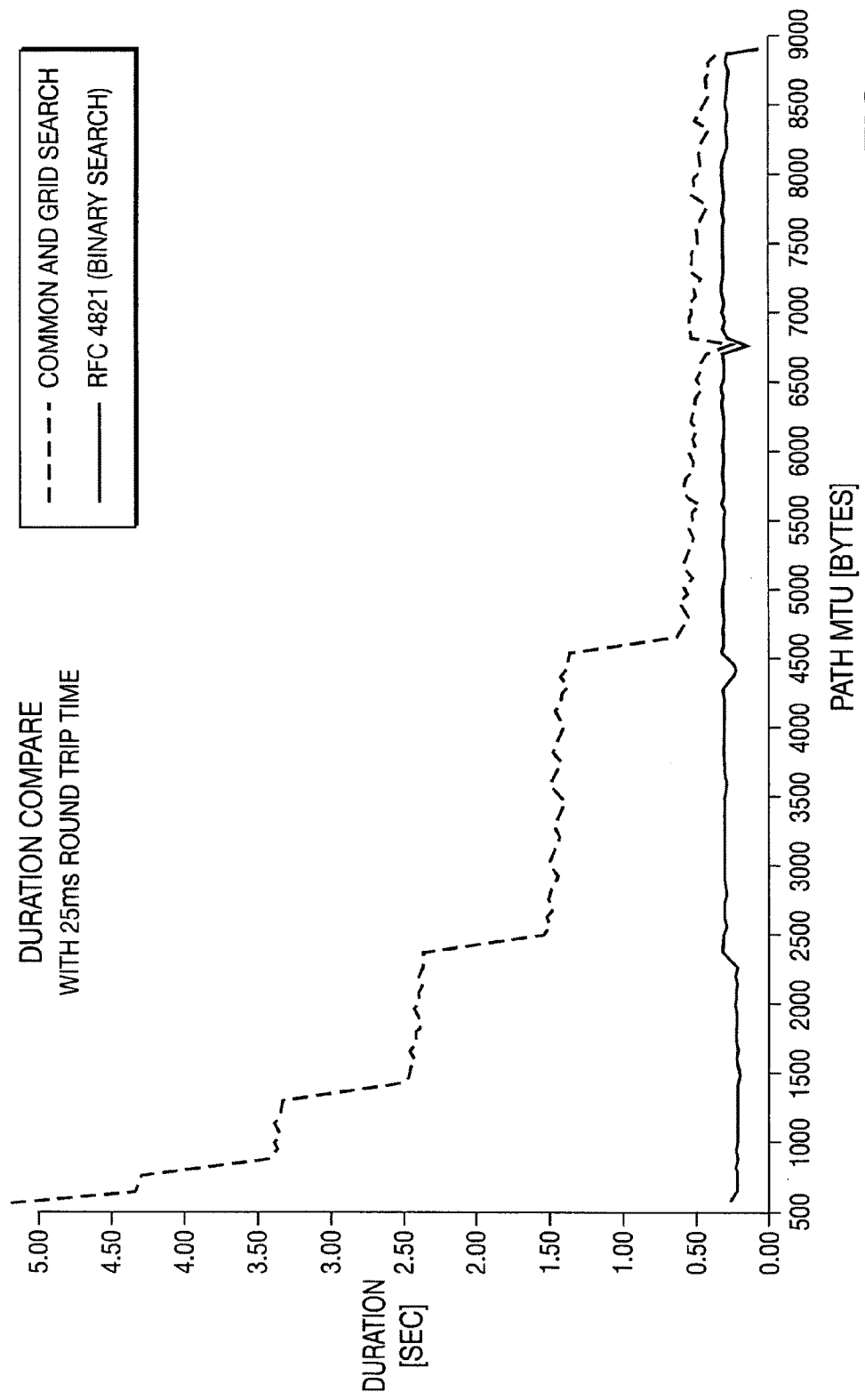

METHOD FOR DETERMINING A DATA TRANSPORT UNIT PARAMETER FOR THE COMMUNICATION BETWEEN TWO STATIONS IN A NETWORK OF STATIONS, NETWORK DEVICE ADAPTED TO ACT AS A SENDING STATION AND NETWORK DEVICE ADAPTED TO ACT AS A RECEIVING STATION IN THE METHOD

This application claims the benefit, under 35 U.S.C. §119 of European Patent Application 08305551.7, filed Sep. 15, 2008 and European Patent Application 09008792.5 filed Jul. 4, 2009.

FIELD OF THE INVENTION

The invention concerns the technical field of a so-called Path MTU (Maximum Transmission Unit) Discovery process between two computing nodes over packet switched networks.

BACKGROUND OF THE INVENTION

Sending large packets reduces the packet header as well as the overall packet processing overhead and improves therefore the network-performance. Especially in high-bandwidth networks, e.g. 10 GBit/s, it's essential to use large packets to fully utilize the link capacity. Using packets bigger than the link MTU will lead to packet fragmentation or even worse—to loss of all data packets. The fragmentation produces unintentional header overhead and additional reassembly time or even in latter case lead to service disruption. On the path between two hosts in the network may exist various hops, e.g. routers, a packet needs to pass. Each link between two hops has its own MTU which may differ on each link. Thus there is a need for means to determine the maximum packet size, which can be transmitted from one end of communication to the other one without packet loss or fragmentation.

LIST OF REFERENCES

[Mo90] J. Mogul. Path MTU Discovery Specification. RFC 1191, IETF, November 1990
[HA03] L. Hak-Goo, K. Young-Keun, K. Sun-Woo, L. Young-Jun. Method for path MTU discovery on IP network and apparatus thereof. Patent No. US2003188015A1, Samsung Electronics Co Ltd (US), October 2003
[Ma07] M. Mathis, J. Heffner. Packetization Layer Path MTU Discovery Specification. RFC 4821, IETF, March 2007

In the following, applicant refers to the above listed references in a simplified form by using only the short reference code provided in the list.

The general path MTU discovery algorithm described in [Mo90] is based on sending probe packets with the DF (don't fragment) bit set in the IP header. Then any device along the path whose outgoing MTU is smaller than the packet, will drop it, and send back an ICMP (Internet Control Message Protocol) message "Fragmentation Needed" containing the actual MTU of the outgoing interface. Receiving this message allows the sending host to reduce its packet size appropriately. The process repeats until the MTU is small enough to traverse the entire path without fragmentation.

The disadvantage of this algorithm and also of the discovery approach described in [HA03] is the dependency on receiving ICMP messages. However, security devices, e.g. firewalls, often block ICMP messages, including the ICMP error messages that are needed for these path MTU discovery algorithms to work.

Another problem with the approach described in [Mo90] is a missing MTU value in the corresponding ICMP message. To deal with it, [Mo90] proposes a search for "likely path MTU values". This search bases on a common MTU table which contains several plateau values to cover the MTU value area. The "likely value" search will send probe packets with sizes from this table and assume the biggest plateau value, which was not answered by an ICMP error message, as path MTU.

This approach still relies on ICMP messages and thus deals with the same disadvantages described before. Furthermore the accurate path MTU will not be found in any case, because similar "likely MTU values" are grouped in plateau values.

The approach described in [Ma07] uses a binary search to work around the problem with dropped ICMP packets. The algorithm relies on the fact, that the sending host sends probe packets which need to be acknowledged by the receiving host. Depending on the reception of an explicit acknowledgement or not in case is of a packet loss, the search area is narrowed setting the lower respectively the upper search limit for further searching.

The disadvantage of this method is the need to wait for an acknowledgment for each single sent probe packet. If a packet was dropped and the receiving host will not send an acknowledgement the sending host must need to wait until a timeout occurs to assume the used MTU was too big. In high delay networks the time needed to wait for the acknowledgement or the according timeout leads to high path MTU discovery durations and in consequence to long connection setup times.

It is an object of the invention to describe a method for a fast and byte accurate path MTU discovery not relying on ICMP messages.

SUMMARY OF THE INVENTION

Like the above mentioned algorithms, the proposed method is also based on sending probe packets with the DF bit set in the according IP header. In order to deal with connections, on which ICMP messages are blocked within the network nodes, the invention relies on acknowledgements of the probe packets sent by the destination host in the same way as in the binary search approach described in [Ma07].

In addition, at first, a common MTU search is done by sending probe packets with MTU sizes of common network technology based MTU values, similar to the "likely path MTU value" search described in [Mo90]. In order to find accurate path MTU values, similar MTUs are not grouped in plateaus. In addition, these common values increased by one byte are sent as well, to identify the effective path MTU is a common MTU or in between of two common MTUs.

In an advanced embodiment of the invention contrary to the approaches described above the probe packets should not be sent individually after the acknowledgement of the previous one arrived, but just sent in a bunch with a threshold data rate meaning that as many probe packets will be sent as the available data rate allows. In order to avoid the sending of 10 Gbit/s peaks it is more appropriate to insert a pause between the transmissions of two probe packets.

In an even more advanced embodiment of the invention, if the common MTU search failed, meaning that the acknowledgements indicate that the path MTU lies in between two common MTU values, a grid MTU search will be applied to the search area left by the common MTU search.

For an optimization it is an advantageous embodiment of the invention to base the grid width (size difference between two consecutive grid search probe packets) used for the grid search on the amount of packets that can be sent within one RTT (round trip time) of the network path. In this way, the grid MTU search can be performed as a highly parallelized binary search operation.

With the proposed path MTU discovery method, the effective path MTU can be discovered much faster than the binary search approach and even than the common MTU search. Moreover, the proposed method does not rely on ICMP messages support of the network between the end systems of communication.

BRIEF DESCRIPTION OF THE DRAWINGS

Exemplary embodiments of the invention are shown in the drawings and are explained in greater detail in the following description.

In the drawings:

FIG. 2 illustrates how a path MTU will be determined with the common MTU search process;

FIG. 3 illustrates how a path MTU will be determined according to the invention with the combined common and grid MTU search process;

FIG. 4 shows two graphs for comparing the resulting MTU search durations one according the binary search and the other for the MTU search according the invention;

DETAILED DESCRIPTION OF PREFERRED EMBODIMENTS

Figure 1:
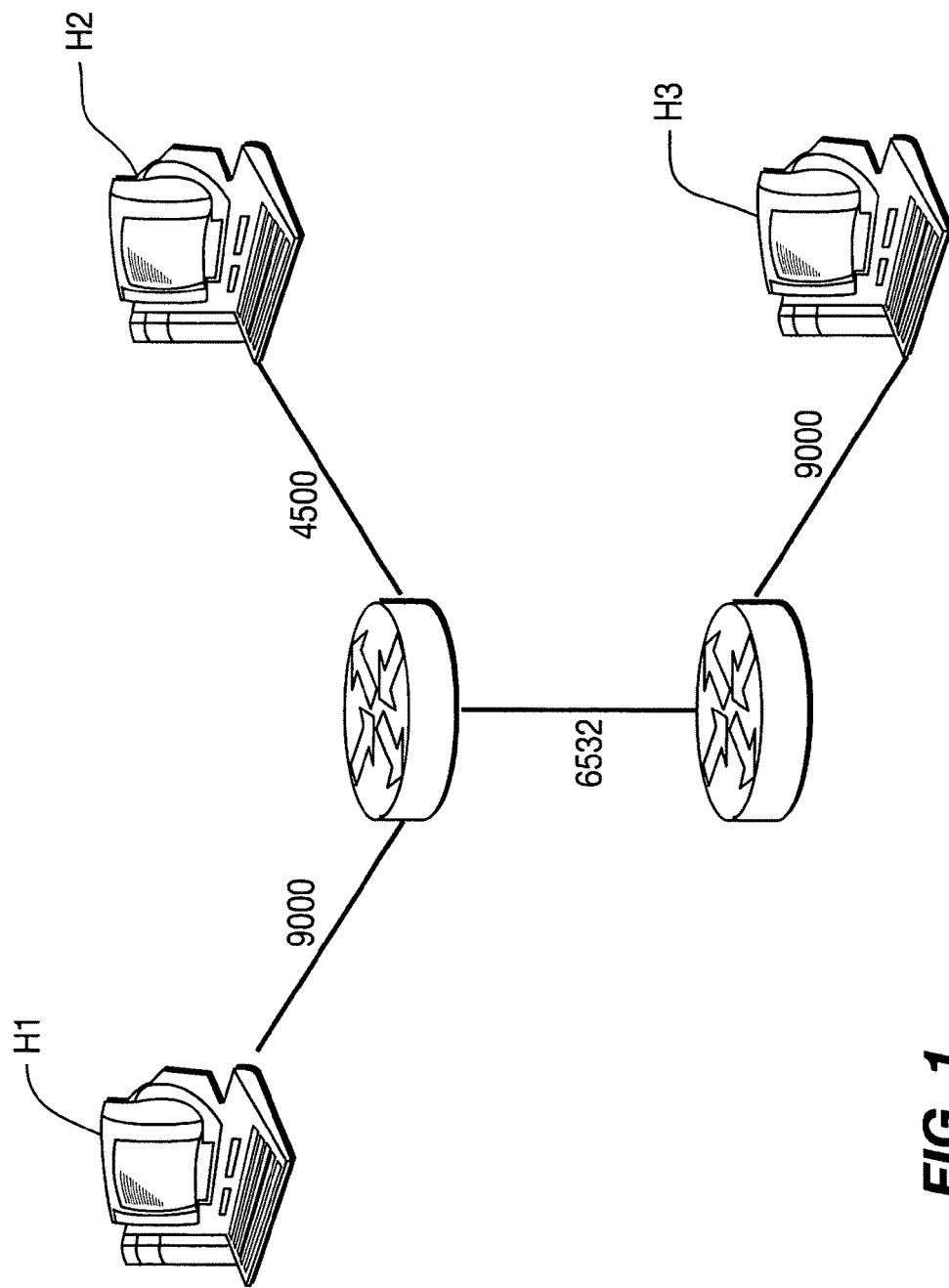
FIG. 1 shows an example of a network with common and uncommon MTU values for the different branches.

FIG. 1 shows a network with three hosts H1, H2, H3, two routers R1, R2 and the actual MTU value on each link. The path MTU between host H1 and host H2 is a common MTU value of 4500 Bytes, whereas the path MTU between host H1 and host H3 is an uncommon MTU of 6532 Bytes. MTU values are usually provided in units of Bytes. This however is just an example and not a limitation. If MTU values are used with different units like Bits, Dibits, Nibbles, Duplets, Triplets, Quadlets, etc. the method and device according the invention will work accordingly is in similar fashion.

In an optimized embodiment of the invention there are two steps to discover the effective path MTU between two hosts.

At first, a common MTU search is performed by sending probe packets with common MTU values. This search bases on the "likely path MTU value" search described in [Mo90]. The requesting host is equipped with an MTU value table for this purpose. However, the intention is here to find accurate path MTU values, so no common MTU grouping is done here. Common MTU values are values given by commonly used network technologies, e.g. Ethernet, ATM, SONET, Infiniband, Interbus, CAN or WLAN. All probe packets are sent with the DF bit set in the IP header structure. To be independent from ICMP messages the algorithm relies on the reception of acknowledgments sent by the destination host for every received probe packet. To make a fast path MTU discovery, all probe packets are sent in one bunch and not one single packet after the acknowledgment of the previous one has arrived. This may be restricted by the number of data packets which can be sent within one RTT. To determine the accurate size of MTU, it is insufficient to send only probe packets with those likely MTU sizes. The effective path MTU could still be between the biggest acknowledged common MTU value and the following bigger unacknowledged value. Therefore probe packets with common MTU values plus one are sent in addition to the plain common MTU values. If after that a common MTU value is the biggest acknowledged MTU it must be the effective path MTU due to the following bigger unacknowledged MTU is the next possible MTU value.

FIG. 2 shows a path MTU discovery case, when it is performed according the invention with pairs of probe packets, one with a common MTU value and the other with the common MTU value increased by one. The search concerns the path between host H1 and host H2.

Hereby, its presumed, that the common MTU table consists of MTU values sized: 576, 1006, 1500, 4500, 8166, 9000. Its evident from the drawing that the first pair of probe packets concerns the MTU values 576 and 577. Both are acknowledged by host H2. Next try concerns the probe packets for the MTU value pair 1006 and 1007, also acknowledged. Third, probe packets for the value pair 1500 and 1501 are used. They are also acknowledged as seen in the drawing. Then probe packets for the MTU value pair 4500 and 4501 are sent. Here, the packet with the value 4500 is acknowledged and the packet with the values 4501 is not acknowledged. In that example, the actual path MTU for the path between host H1 and host H2 via router R1 is determined and equals 4500 Bytes.

If one of the additional values is the biggest acknowledged MTU, the effective path MTU is an uncommon MTU value between the biggest acknowledged value and the following bigger unacknowledged common MTU value or the biggest acknowledged value itself.

To figure out this uncommon MTU, a grid MTU search will be performed in a second step. In an advantageous embodiment of the invention, the sending host calculates the average Round Trip Time RTT existing between it and the destination host while receiving the acknowledgements during the search with common MTU values. Exactly this timeframe should be used by the grid MTU search to send probe packets covering the search area left by the step of searching with common MTU values. When receiving the first acknowledgement, the last probe packet was just sent. One grid MTU search cycle will take the time of twice the RTT, plus a packet timeout value in the worst case. One RTT is spent to send probe packets and another one to receive the according acknowledgments.

FIG. 3 shows the more generic scenario, covered by the discovery case between host H1 and host H3. In that example, during the search with common MTU values, the packet with the size of 4501 bytes would be the last acknowledged MTU probe packet. So, the remaining area to cover is between: 4501 bytes (incremented common MTU value) and 8166 bytes. The last unacknowledged value will also be taken into account in this embodiment because it might be that this probe packet has been lost on the way to its destination so that it is safer to test this MTU value again.

possible values: 8166−4501=3665 bytes average RTT: 20 ms average time to send one probe packet: 0.11 ms/packet number of probe packets sent in one RTT: 20 ms/0.11 ms/packet≈182 packets grid width: 3665 byte/182 packets≈20 byte/packet So 182 packets are sent, wherein each packet is made 20 byte bigger than the previous one.

After one cycle consisting of two RTT times in the case above the left search area contains only twenty values. In comparison, the binary search approach according to [Ma07] just quarters the initial area to about 900 values in the same time of two RTT times. After one additional cycle the grid search method will have found the effective path MTU, by contrast the binary search will take a time of about another 9 RTT to discover the effective path MTU.

FIG. 4 illustrates the duration advantage of the method according the invention against the binary search method according to [Ma07]. The solid line represents the values for the combined search with the initial common values and refining grid search values and the dashed line represents the values for the binary search process. For a better comparability identical initial timeout values and timeout calculations were used in both methods.

Figure 5:
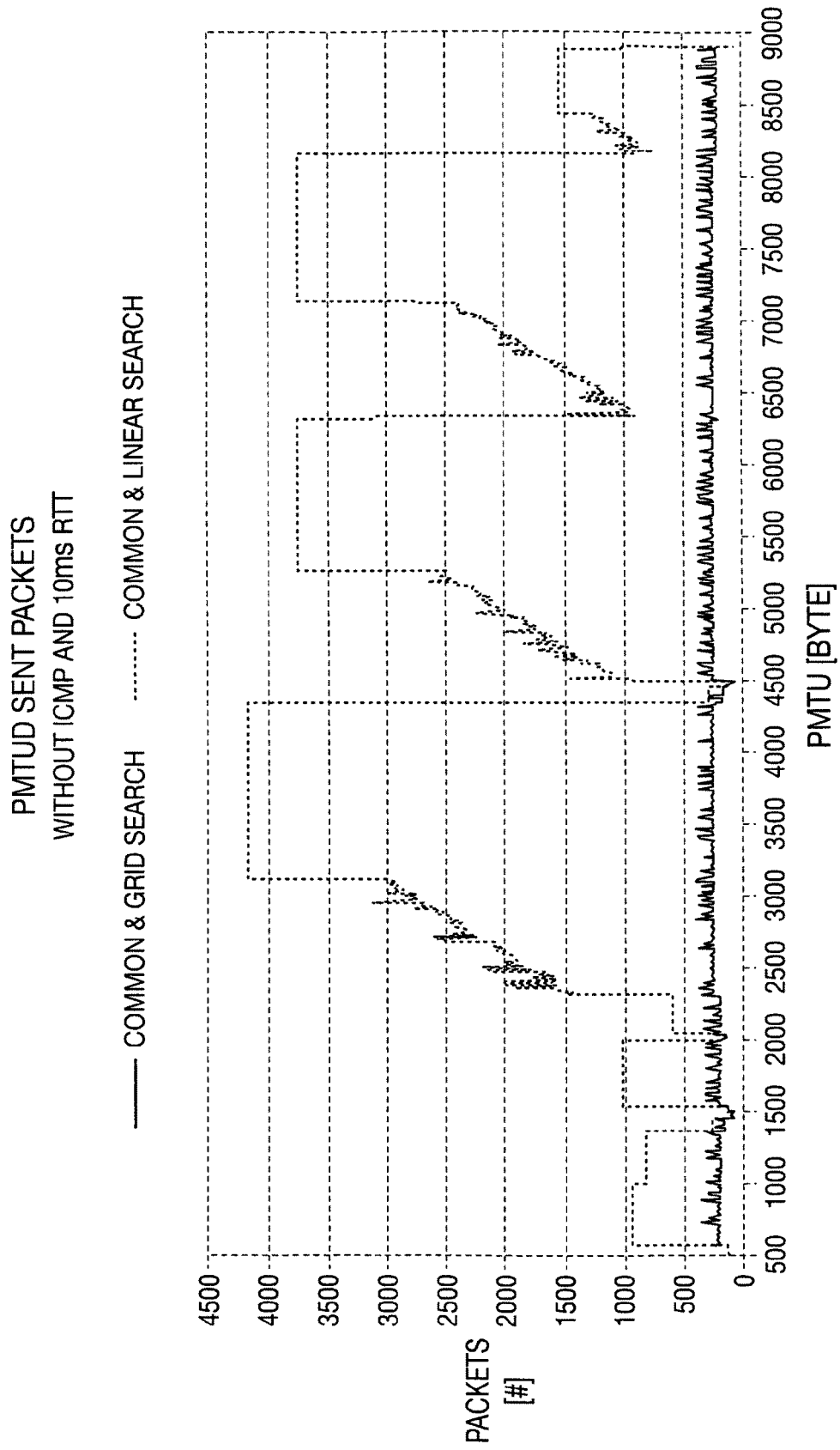
FIG. 5 shows two graphs for comparing the amount of sent packets needed for determining the MTU value one according a combined common and linear search and the other for the MTU search according the invention.

To find an uncommon MTU value between two common MTU values a brute-force linear search could be performed in alternative fashion. This approach is very simple to implement but it needs a multiple number of packets, which will unnecessarily flood the network with a high amount of probe packets during each path MTU discovery. FIG. 5 shows the essential difference between the number of sent packets used by the combined grid MTU search, proposed with this invention, and the brute-force linear search approach. In worst case the brute-force approach will need twenty times the amount of packets and in average still ten times more compared to the combined grid MTU search.

The general idea of the invention is applicable in all cases where the round trip time RTT is the determining factor of the duration.

What is claimed is:

1. A method for determining a data transport unit parameter for communication between two stations in a network of stations, wherein for the data transport unit parameter, a number of common values exists and for a communication path between the two stations, an optimum value of the data transport unit parameter exists depending on the communication technology or network equipment configuration used, the method comprising the steps of:
    sending a plurality of pairs of probe data transport units to a partner station, for each pair, a first data transport unit parameter being from the set of common values for the data transport unit parameter and a second data transport unit parameter being the first data transport unit parameter increased by a minimum possible increment, and sending each of said plurality of pairs of probe data transport units without waiting for a response message corresponding to the previous pair of probe transport units;
    evaluating, in a processor, corresponding response messages from the partner station to determine the range between two values from the set of common values in which the optimum value exists;
    performing a grid search in the determined range, wherein the probe data transport unit parameters for the grid search are sent with a fixed size interval, hereinafter called grid width, the data transport units being sent without waiting for the response message corresponding to the previous grid search probe data transport unit to be received, and in which a grid cell in which the optimum value of the data transport unit parameter lies is determined by evaluating response messages for the probe data transport units sent during the grid search.

2. The method according to claim 1, wherein in the probe data transport units include a field with a marker information item set to indicate that the fragmentation of the probe data transport unit is forbidden.

3. The method according to claim 1, wherein any device along the communication path between the two stations responds to the probe data transport unit with a message that indicates that the received probe data transport unit is dropped and requires fragmentation in the event that a next section of the communication path in a sending direction has a limited transport characteristic which is exceeded by the probe data transport unit according to the set data transport unit parameter.

4. The method according to claim 1, further comprising a step of determining the round trip time (RTT) for the network path between the sending host and the destination host, in particular, the average RTT, wherein the RTT is used for determining the grid width for the grid search so that the probe data transport units for the grid search can be sent within one RTT.

5. The method according to claim 1, in which the optimum value of the parameter is the maximum transmission unit (MTU), which defines a maximum data transport unit length supported in the communication protocol for that section of the communication path used.

6. The method according to claim 2, wherein the marker information item is the Don't Fragment (DF) bit in an Internet Protocol IP packet header.

7. A method for determining an optimum value for a data transport unit parameter for a communication path between a first station and a second station in a network of stations, the method comprising the steps of:
    in a processor at the first station, sending a plurality of pairs of data transport units, within one round trip time, to the second station via said communication path, wherein a first data transport unit of each pair corresponds to a common parameter value, and a second data transport unit of each pair corresponds to the common parameter value of the first data transport unit incremented by a minimum possible increment;
    receiving at the first station, an acknowledgement message from the second station on a condition that a sent transport data unit is able to be received by the second station, wherein no acknowledgement message is received when the sent transport data unit is not able to be received by the second station;
    determining a range of the data transport unit parameter containing the optimum parameter value, based on parameter values corresponding to a maximum acknowledged parameter value and a minimum unacknowledged parameter value; and
    iteratively performing a grid search of the determined range of data transport unit parameters, wherein a width of the grid is determined based on a maximum number of data transport units that may be transmitted within an average round trip time of the communication path and wherein a range of the data transport unit parameter for each subsequent iteration corresponds to a grid width determined to contain the optimum value of the data transport unit parameter in a prior iteration.

8. The method of claim 7, wherein said data transport unit is a data packet, and said data transport unit parameter is a data length of said data packet.

9. The method of claim 7, wherein the optimum data transport unit parameter is the maximum transmission unit (MTU) for the communication path.

10. The method of claim 7, wherein the plurality of pairs of data transport units are transmitted without waiting for an acknowledgement message or a timeout interval from a preceding sent data transport unit.

11. The method of claim 7, further comprising:
providing each of the data transport units of the plurality of pairs of data transport units with an indicator which indicates that the data transport unit is not permitted to be fragmented during transmission via the communication path.

12. A network station configured to determine an optimum parameter value for a communication path between the network station and a second network station, the network station comprising:
a processor configured execute machine readable instructions;
a memory storing machine readable instructions which when executed by said processor cause said processor to:
transmit a plurality of pairs of probe data transport units to the second station via the communication path, wherein each pair of probe data transport units includes a first data transport unit having a parameter value corresponding to one of a set of common parameter values, and a second data transport unit having a parameter value equal to the parameter value of the first data transport unit incremented by a minimum possible increment;
receive an acknowledgement message from the second station for each data transport unit in the plurality of pairs of data transport units which the second station is able to receive based on the data transport unit parameter value;
determine a range of parameter values containing the optimum parameter value based on a maximum parameter value of all acknowledgement messages received, and a minimum parameter value of all data transport units for which an acknowledgement message was not received;
iteratively performing the transmitting, receiving and determining steps, defining a grid search, wherein for each subsequent iteration, a grid width is determined based on a number of data transport units that may be transmitted in one round trip time, and wherein the method terminates when the determined grid width is equal to the minimum possible increment.

13. The network station of claim 12, wherein the data transport unit is a data packet, and the data transport unit parameter is a data length of the data packet.

14. The network station of claim 13, wherein the minimum increment is one byte.

15. The network station of claim 12, wherein the optimum parameter value is the maximum transmission unit (MTU) of the communication path.

16. The network station of claim 12, wherein each of said plurality of pairs of data transport units is transmitted without waiting for an acknowledgement message for a previous data transport unit or a timeout interval for an unacknowledged data transport unit.

17. A network device for determining an optimum parameter value for a communication path between the network device and a second network device, the network device comprising:
a processor configured to execute machine readable instructions;
a memory storing machine readable instructions which when executed by said processor cause said processor to:
transmit a plurality of pairs of probe data transport units to the second network device via the communication path, wherein each pair of probe data transport units includes a first data transport unit having a parameter value corresponding to one of a set of common values, and a second data transport unit having a parameter value equal to the parameter value of the first data transport unit incremented by a minimum possible increment;
receive an acknowledgement message from the second device for each data transport unit in the plurality of pairs of data transport units which the second device is able to receive based on the data transport unit parameter value;
determine a range of parameter values containing the optimum parameter value based on a maximum parameter value of the acknowledgement messages received, and a minimum parameter value of the data transport units for which an acknowledgement was not received;
performing a grid search in the determined range of parameter values, wherein the probe data transport unit parameters for the grid search are sent with fixed size interval, hereinafter called grid width, the data transport units being sent without waiting for a response message corresponding to the previous grid search probe data transport unit to be received, and in which a grid cell in which the optimum value of the data transport unit parameter lies is determined by evaluating response messages for the probe data transport units sent during the grid search.

18. The network device according to claim 17, wherein said memory is further storing machine readable instructions which when executed by said processor cause said processor to:
determine the round trip time (RTT) for the network path between the first and second network devices, in particular the average round trip time, wherein the RTT is used for determining the grid width for the grid search so that the probe data transport units for the grid search can be sent within one RTT.

* * * * *